H. M. PFLAGER.
CAR TRUCK.
APPLICATION FILED JULY 17, 1914.

1,147,430.

Patented July 20, 1915.
2 SHEETS—SHEET 1.

Witnesses

Inventor
Harry M. Pflager,
By _____, Atty.

H. M. PFLAGER.
CAR TRUCK.
APPLICATION FILED JULY 17, 1914.
1,147,430.
Patented July 20, 1915.
2 SHEETS—SHEET 2.
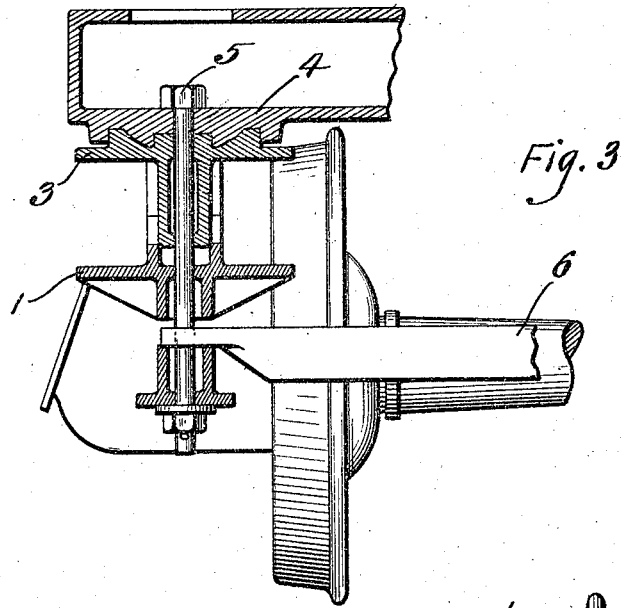
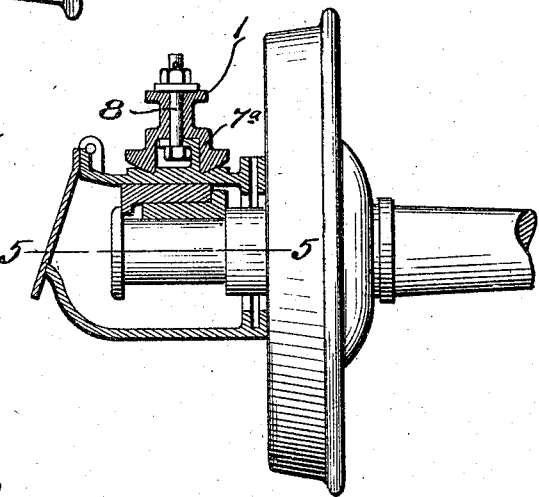
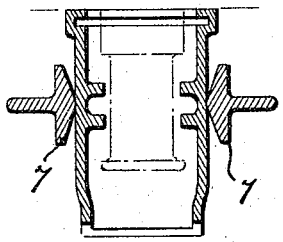
Witnesses
Inventor
Harry M. Pflager

UNITED STATES PATENT OFFICE.

HARRY M. PFLAGER, OF ST. LOUIS, MISSOURI.

CAR-TRUCK.

1,147,430.   Specification of Letters Patent.   Patented July 20, 1915.

Application filed July 17, 1914. Serial No. 851,489.

*To all whom it may concern:*

Be it known that I, HARRY M. PFLAGER, a citizen of the United States, residing at the city of St. Louis, State of Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1:
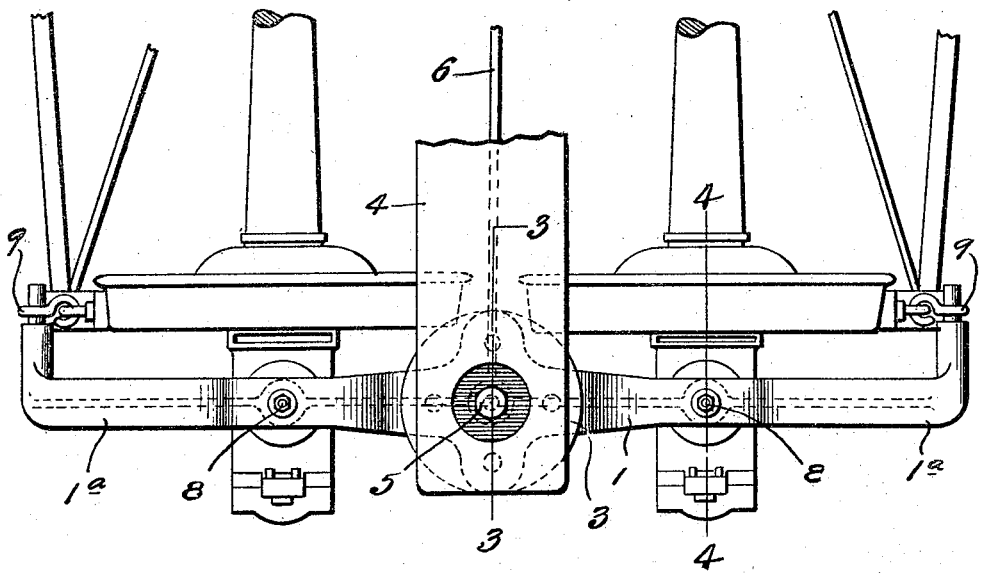
Figure 2:
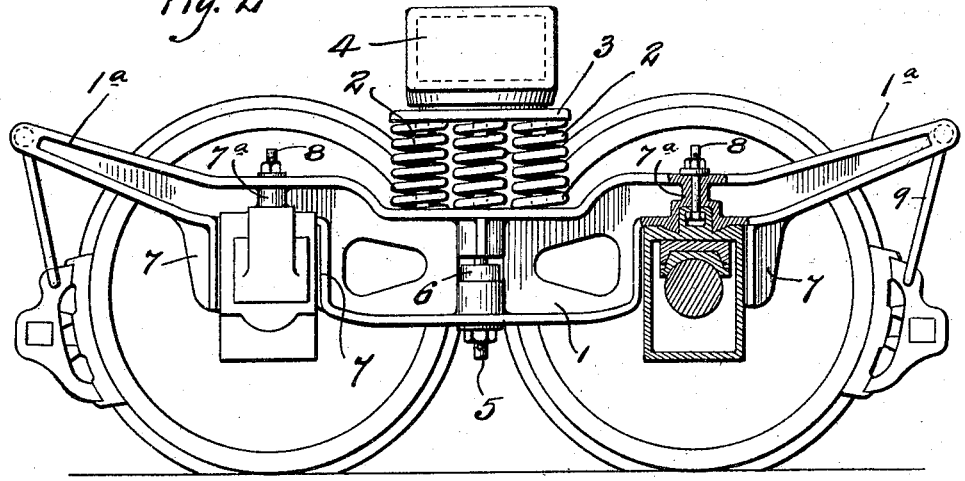

Figure 1 is a partial top plan view of my improved car truck. Fig. 2 is a side elevational view partly in section. Fig. 3 is a sectional view on line 3—3 of Fig. 1. Fig. 4 is a sectional view on line 4—4 of Fig. 1. Fig. 5 is a sectional view on line 5—5 of Fig. 4.

This invention relates to a new and useful improvement in car trucks and is designed particularly as an improvement upon United States Letters Patent No. 995,560, granted to me June 20, 1911. In the aforementioned patent, the journal boxes were fixedly mounted with relation to the side frames of the truck and the journal brasses were pivotally mounted in the journal boxes, the side frames of the truck having pivotal relation to the underframe of the car whereby they could swing horizontally and parallelism be maintained between the axles carrying the wheels.

In the construction of the patent just mentioned, the wheel axles of necessity had swinging motion relative to the journal boxes with the result that the dust guards, as ordinarily constructed, could not maintain the proper relation to the axles. In my present construction, the side frames of the truck are pivotally connected to the underframe of the car, or a part thereof, such as the body bolster and, instead of having the journal brasses pivotally mounted in the journal boxes, I pivotally mount the journal boxes in the truck side frames and am thus enabled to maintain parallelism of the wheel axles without disturbing the relation between the dust guards and the axles.

In the drawings 1 indicates the truck side frame, preferably made of a casting, having spring seats for the supporting springs 2 whose upper ends coöperate with a spring bearing plate 3, having a concentric bearing member coöperating with a conversely-shaped bearing member on the body bolster 4. The casting 1 and bearing member 3 are constructed in a manner that permits of their vertical movement without, at the same time, enabling either of the parts to rotate relative to each other. A king bolt 5 passes through the parts and acts as a swiveling pin on which the side frames of the truck may turn relative to the end frame of the car.

Each side frame is provided with an opening in registration with the king bolt 5 whereby a cross connecting member 6 extends from side frame to side frame and may be connected and thereby add to the rigidity of the structure. Each side frame is further provided with pedestal jaws 7 in which the journal boxes of the truck are mounted; but instead of mounting these journal boxes rigidly in the truck side frames, said journal boxes are provided with bearings on their upper faces, see Fig. 4, which bearings coöperate with the concentric bearings on the under side faces of the truck side frames between the pedestal jaws.

Each truck side frame is recessed so as to receive a boss $7^a$ on the journal box, which boss is slotted to receive the bolt 8 which extends up through the truck side frame and serves to hold the journal box against vertical displacement between the pedestal jaws. This bolt 8 may have the nut and cotter pin at its upper end, as is usual in constructions of this kind. The pedestal jaws 7, or rather the inner faces of the truck frame casting with which the journal box coöperates, are preferably beveled, as shown in Fig. 5, so as to permit a horizontal swinging movement of the journal box about its pivotal axis whereby when taking curves the truck side frames swing on their pivotal axes and the journal boxes swing on their pivotal axes.

Each truck side frame is preferably provided with an extension $1^a$ extending beyond the journal boxes for supporting the brake beam hanger 9 by which the brake beams of usual construction are suspended in operative position.

I claim:—

1. In car construction, an underframe, truck side frames each pivotally connected thereto, said truck frames having two or more journal boxes pivotally connected thereto, and axles mounted in said journal boxes and movable in a horizontal direction therewith, said axles carrying wheels.

2. In car construction, an underframe, truck side frames each having pivotal relation to said underframe, journal boxes pivotally mounted with respect to said truck side frames, axles mounted in said journal boxes and having a horizontal swinging motion therewith whereby horizontal relation between said axles and journal boxes is maintained at all times, and wheels on said axles.

3. In car construction, the combination of a truck side frame having pivotal relation to the underframe of the car, said truck side frame having pedestal jaws whose inner faces are inclined in opposite directions thereby providing vertically disposed apex bearing points, and journal boxes having bearing faces on their upper walls coöperating with the converse bearing faces on the truck side frame, said journal boxes also having means for receiving a swivel bolt, and a swivel bolt for connecting said journal boxes to said truck side frame.

4. In car construction, an underframe, wheels, axles on which said wheels are mounted, journal boxes on the ends of the axles, and truck side frames each pivotally connected to said underframe and each being pivotally supported by a pair of journal boxes through the medium of fixedly located pivots, whereby said truck side frames may each swing horizontally and independently upon the supports furnished by said journal boxes.

5. In car construction, axles, wheels arranged thereon, journal boxes on the ends of the axles, truck side frames pivotally supported at their ends by said journal boxes so as to have a horizontal swinging movement independently of said journal boxes, and each of said truck side frames being independently and pivotally connected to the underframe of the car at about the central portion thereof.

In testimony whereof I hereunto affix my signature in the presence of two witnesses, this 15th day of July, 1914.

HARRY M. PFLAGER.

Witnesses:
M. P. SMITH,
M. A. HANDEL.